3,280,075
THERMOSTABLE, SUBSTANTIALLY AROMATIC HIGH MOLECULAR WEIGHT COMPOUNDS AND THEIR PRODUCTION FROM HOMOPOLYMERS AND COPOLYMERS OF UNSATURATED KETONES
Herbert Naarmann, Ludwigshafen (Rhine), and Ernst-Guenther Kastning, Assenheim, Pfalz, Germany, assignors to Badische Anilin- & Soda-Fabrik Aktiengesellschaft, Ludwigshafen (Rhine), Germany
No Drawing. Filed Oct. 15, 1964, Ser. No. 404,171
Claims priority, application Germany, Oct. 19, 1963, B 73,938
3 Claims. (Cl. 260—63)

This invention relates to thermostable, substantially aromatic high molecular weight compounds and to a process for their production.

The thermostable, substantially aromatic high molecular weight compounds are obtained by heating polymers of vinyl methyl ketone or isopropenyl methyl ketone or of cyclization products of these compounds in the presence of metal halides and dehydrogenating agents.

Suitable polymers of vinyl methyl ketone or isopropenyl methyl ketone are homopolymers of these compounds or copolymers of the two compounds or of either or both of them with other $\alpha,\beta$-ethylenically unsaturated monomeric polymerizable compounds.

$\alpha,\beta$-ethylenically unsaturated polymerizable compounds suitable as comonomers are for example vinylaromatic compounds, such as styrene or substituted styrenes, nitriles of $\alpha,\beta$-ethylenically unsaturated carboxylic acids, such as acrylonitrile, methacrylonitrile, 1,3-diolefins, such as butadiene or isoprene, and vinyl chloride.

The copolymers of vinyl methyl ketone or isopropenyl methyl ketone should contain at least 50% by weight of polymerized vinyl methyl ketone or isopropenyl methyl ketone units.

Cyclization products of homopolymers of vinyl methyl ketone or of isopropenyl methyl ketone or of copolymers of vinyl methyl ketone and isopropenyl methyl ketone are also suitable for the process. They are formed by intramolecular condensation of the keto groups with the methyl group attached to a vicinal keto group. They are obtained for example by the action of polyphosphoric acid or hydrochloric acid on the polymers in tetrahydrofuran solution or by the action of alkaline substances, such as potassium carbonate, barium hydroxide or tetramethylammonium hydroxide. These cyclization products are described for example in articles by R. C. Schulz, H. Vielhaber and W. Kern in "Kunststoffe," volume 50, 500–502 (1960), and by W. Cooper and C. Catterall in "Chemistry and Industry," 1514–1515 (1954).

For example cyclization products of polyvinyl methyl ketone may contain the following structural units:

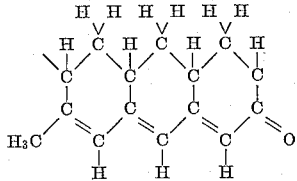

Fluorides, chlorides and bromides of metals of groups III–A, IV–B, V–B, VI–B and VII–B of the periodic chart of the elements ("Handbook of Chemistry and Physics," 40th ed., Chemical Rubber Publishing Co., Cleveland, Ohio, U.S.A., pages 448–449) and of zinc and iron are suitable metal halides for the process.

The metal halides are in general used in amounts of 1 to 25% by weight, preferably 5 to 20% by weight, with reference to the polymerization or cyclization product. Larger amounts of halides may be used but in general no advantage results.

Dehydrogenating agents suitable for the purposes of this invention are for example compounds such as are described in the handbook of Houben-Weyl, "Methoden der organischen Chemie," 4th ed., Verlag Georg Thieme, Stuttgart, 1955, vol. IV, part 2, pages 192, 193 and 338. Specific examples are readily reducible metal compounds, such as copper (II), mercury (II), manganese (III), maganese (IV), manganese (VII), cobalt (III), lead (IV), cerium (IV), platinum (IV) and palladium (IV) halides, for example chlorides.

Inorganic compounds which decompose with disengagement of oxygen, such as manganese dioxide, cobalt oxide, copper oxide, silver oxide and potassium nitrate, peroxychromic acid, osmium tetroxide and rhenium heptoxide, are also suitable.

Oxygen may also be used as the oxidizing agent. Sulfur, selenium and precious metal catalysts which contain palladium or platinum, and also copper powder may moreover be used.

The oxidizing agents are generaly used in equal amounts to the metal halides. The amounts of metal halides and dehydrogenating agents together should however not exceed 30% by weight with reference to the initial materials.

The mixtures of the vinyl methyl ketone or isopropenyl methyl ketone polymers or the cyclization products of these compounds with metal halides and dehydrogenating agents are heated to 30° C. to 800° C., preferably 50° C. to 600° C. The reaction proceeds very slowly below 30° C.; above 800° C., the reaction products may decompose.

Sometimes it is advantageous to add to the reaction mixture compounds which combine with water, such as acetic anhydride or anhydrous sodium acetate.

Since the reaction proceeds very rapidly, it is advisable to place the mixture of metal halides and dehydrogenating agents in a reactor and to introduce the polymerization or cyclization products into the reactor at the rate at which the reaction proceeds. It is advantageous to use a melt.

The process may also be carried out continuously for example by feeding the initial materials into a rotary kiln and discharging the reaction products at the other end of the rotary kiln.

Low molecular weight constituents and catalyst constituents may be removed from the reaction products for example by solvent extraction.

Using polyvinyl methyl ketone as an example, the reaction may be illustrated by the following equation:

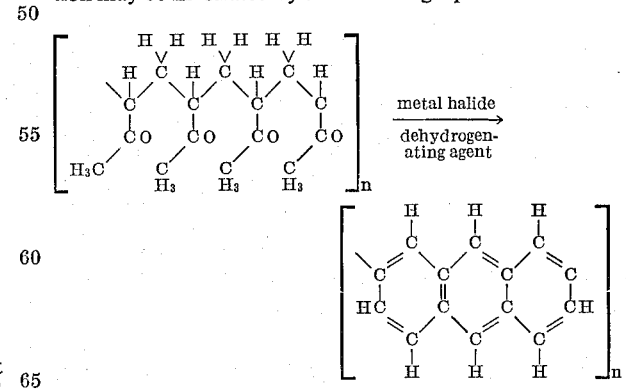

High molecular weight compounds obtained according to this invention are brown to deep black in color. They do not usually dissolve in organic solvents, such as chloroform, dioxane or dimethylformamide. As may be detected for example by infrared spectroscopic investigation, the reaction products have extensive aromatization, i.e., they contain repeating units having the following general formula:

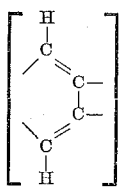

By appropriate choice of the type and amount of the copolymerization components of the initial materials, it is possible to vary the properties of the reaction products, for example the melting point. Generally the melting points are above 350° C. The compounds are substantially chemically resistant. They are not attacked for example by acids, such as sulfuric acid or nitric acid.

When the high molecular weight compounds obtained by the process have relatively low melting points, they may be processed into moldings by the conventional methods for processing thermoplastics, for example by press-molding. Products having high melting points are advantageously sintered under pressure.

Aromatized high molecular weight compounds obtained by the process according to this invention have a relatively high specific conductance which is generally from $10^{-3}$ to $10^{-13}$ mhos/cm.

Semiconductors or thermostable coating compositions, moldings or fabrics for example may be prepared from the compounds. The invention is further illustrated by the following examples in which parts are by weight. The values for specific conductance are measured at 25° C.

Example 1

100 parts of polyvinyl methyl ketone having a K-value of 64 (powdered) is slowly added during the course of one hour while stirring to a mixture, kept at 150° C., of 10 parts of aluminum bromide, 5 parts of zinc (II) chloride and 10 parts of copper (II) chloride.

A brown black reaction product forms in a vigorous reaction. After the reaction is completed, water is added to the product which is then boiled with 10% hydrochloric acid.

The product is washed, dried and extracted with dioxane. 91 parts of a black insoluble reaction product is obtained which is not decomposed at 450° C. and has a specific conductance of $2.4 \times 10^{-4}$ mhos/cm. Moldings, which are suitable for example as thermostable sealing compositions, may be obtained from the reaction product by press-molding at 200° C. and 200 atmospheres gauge pressure.

Example 2

100 parts of cyclized polyvinyl methyl ketone is mixed with 20 parts of copper oxide and 20 parts of iron (III) chloride, the whole heated to 250° C. under a nitrogen atmosphere in a rotating tube and kept at this temperature for three hours. The product is boiled up, washed with water and dried. 94 parts of a deep black insoluble product is obtained which is substantially aromatized according to infrared investigation. Elementary analysis gives a C/H ratio of 1:less than 1. The product has a specific conductance of $3.9 \times 10^{-4}$ mhos/cm. and is stable up to 650° C. It can be press-molded at 150° C. and 200 atmospheres gauge.

Example 3

100 parts of a coplymer of 65% by weight of isopropenyl methyl ketone and 35% by weight of styrene (K-value 61.5) is heated at 160° C. with 20 parts of aluminum chloride, 10 parts of acetic anhydride and 20 parts of iron (III) chloride while stirring.

The product is washed with water and methanol and dried. 92 parts of a brown black product is obtained which is thermostable up to 350° C. and has a specific conductance of $4.9 \times 10^{-10}$ mhos/cm. It may be molded at room temperature.

By following the same procedure but at 50° C., 78 parts of a product is obtained having a specific conductance of $1.6 \times 10^{-11}$ mhos/cm.

Example 4

100 parts of a copolymer of 80% by weight of isopropenyl methyl ketone and 18% by weight of vinyl chloride (K-value 53.5) is heated with 10 parts of acetic anhydride and 20 parts of iron (III) chloride for four hours at 160° C.

After working up, 93 parts of a brown black insoluble product is obtained which is thermally stable up to 250° C. and has a specific conductance of $5.3 \times 10^{-7}$ mhos/cm. Aromatic structural units can be detected by infrared spectroscopy.

Example 5

100 parts of a copolymer of 81% by weight of isopropenyl methyl ketone and 29% by weight of butadiene (K-value 83) (in which 45% by weight of the butadiene is present in 1,2-vinyl combination) is reacted and processed as described in Examples 3 and 4. 98 parts of a black reaction product is obtained. Elementary analysis gives a C/H ratio of 1:1.2.

If this product be subsequently mixed with 5% by weight of copper oxide and 0.5% by weight of platinum and heated in a current of nitrogen at 300° C., almost complete dehydrogenation takes place and the infrared spectrum indicates a substantially aromatic system. The compound obtained contains the following repeating unit:

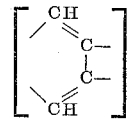

The C/H ratio is 1:0.91 according to elementary analysis. The reaction product is elastic and thermally stable up to 650° C. It may be molded at room temperature under a pressure of 100 atmospheres gauge. Sealing compounds may be prepared from the reaction product.

Example 6

100 parts of a copolymer of 51% by weight of vinyl methyl ketone and 49% by weight of acrylonitrile (K-value 67) is mixed with 10 parts of titanium tetrachloride and 20 parts of copper (II) chloride and the whole heated for ninety minutes at 140° C. Then 10 parts of manganese dioxide is added and the mixture is heated for four hours at 300° C. in a stream of nitrogen.

The reaction mixture is processed conventionally and 94.5 parts of a deep black product is obtained which according to infrared investigation is substantially aromatized. The C/H ratio determined by elementary analysis is 1:0.8. The product is suitable as a semiconductor resistor for the electrical industry. It may be press-molded at 200° C. and 200 atmospheres gauge.

Example 7

100 parts of cyclized polyisopropenyl methyl ketone is heated with 10 parts of silver oxide and 10 parts of manganese tetrachloride under nitrogen to 350° C. during the course of three hours. The mixture is then heated to 550° C. in the course of two hours in a rotating tube and left at this temperature for another hour. The product is boiled up and washed with 10% acetic acid and water and then dried. 93 parts of a deep black insoluble product is obtained which according to infrared analysis is substantially aromatized and has a specific conductance of $2.1 \times 10^{-3}$ mhos/cm. The product contains 0.25% by weight of oxygen.

The above procedure is followed by the silver oxide is replaced by lead oxide. The product formed contains 1.2% of oxygen. It has a specific conductance of $8.3 \times 10^{-5}$ mhos/cm.

*Example 8*

100 parts of a filamentary copolymer of 65% by weight of vinyl methyl ketone and 35% by weight of methacrylonitrile which has a K-value of 92.5 (0.1% in dimethylformamide) is mixed with 10 parts of molybdenum hexachloride and 0.2 part of platinum powder and heated to 550° C. during the course of six hours. The product is washed and dried. 91 parts of black polymer filaments is obtained. Aromatic groups are detectable by infrared analysis. The specific conductance is $3.9 \times 10^{-3}$ mhos/cm.

*Example 9*

The procedure of Example 8 is followed but 10 parts of boron trichloride is used as the metal halide and 0.2 part of osmium tetroxide is used as the dehydrogenating agent. 93 parts of black polymer filaments is obtained on which a specific conductance of $3.1 \times 10^{-4}$ mhos/cm. is measured. The filaments contain 0.8% of oxygen.

Titanium tetrachloride may also be used instead of boron trichloride. 94 parts of a polymer having a specific conductance of $4.9 \times 10^{-4}$ mhos/cm. is then obtained.

*Example 10*

The procedure of Example 5 is followed but a copolymer of 81% by weight of isopropenyl methyl ketone and 29% by weight of isoprene is used having a K-value of 90.5. 87 parts of a black reaction product is obtained in which condensed aromatic groupings are detectable by infrared analysis.

The product may be molded for example at a pressure of 200 atmospheres gauge and a temperature of 300° C. and it is suitable for the production of sealing compounds, and coatings which are resistant even to red heat.

We claim:
1. A process for the production of thermostable substantially aromatic high molecular weight compounds which comprises heating a polymer selected from the group consisting of polyvinyl methyl ketone, polyisopropenyl methyl ketone, copolymers of vinyl methyl ketone and isopropenyl methyl ketone, cyclization products of said polymers and copolymers of (a) at least one of a member selected from the group consisting of vinyl methyl ketone and isopropenyl methyl ketone with (b) at least one monomer selected from the group consisting of acrylonitrile, methacrylonitrile, styrenes, butadiene, isoprene, and vinyl chloride, said last-mentioned copolymers containing at least 50% by weight of (a), to a temperature of from 30° C. to 800° C. in the presence of at least one metal halide selected from the group consisting of fluorides, chlorides and bromides of metals of groups III–A, IV–B, V–B, VI–B and VII–B of the periodic chart of the elements appearing in the 40th ed. of "Handbook of Chemistry and Physics," pages 448–449, and of iron and zinc, and at least one dehydrogenating agent.

2. A process as claimed in claim 1 wherein the polymer is heated in the presence of 1 to 25% by weight of the metal halide and 1 to 25% by weight of the dehydrogenating agent, the total amount of metal halide and dehydrogenating agent not exceeding 30% by weight, all percentages being with reference to the polymer.

3. A thermally stable, substantially aromatic, high molecular weight compound produced by the process as claimed in claim 1, said compound having a specific conductance of $10^{-3}$ to $10^{-13}$ mhos/cm.

No references cited.

SAMUEL H. BLECH, *Primary Examiner.*

WILLIAM H. SHORT, *Examiner.*

C. A. WENDEL, *Assistant Examiner.*